United States Patent [19]

Eash

[11] 4,202,809
[45] May 13, 1980

[54] STYRENE-BUTADIENE-ACRYLONITRILE INTERPOLYMER LATEX BASED CEMENT ADDITIVES

[75] Inventor: R. Douglas Eash, Midland, Mich.

[73] Assignee: The Dow Chemical Company, Midland, Mich.

[21] Appl. No.: 916,168

[22] Filed: Jun. 16, 1978

Related U.S. Application Data

[63] Continuation-in-part of Ser. No. 815,966, Jul. 15, 1977, abandoned.

[51] Int. Cl.² .................................................. C08K 3/00
[52] U.S. Cl. .................................. 260/29.7 S; 106/90; 260/29.1 SB; 260/29.6 PS; 260/29.7 E; 260/29.7 T; 260/42.13
[58] Field of Search ........... 260/42.13, 29.7 S, 29.7 T, 260/29.7 E, 29.6 PS, 29.1 SB; 106/90

[56] References Cited

U.S. PATENT DOCUMENTS

| 28,722 | 2/1976 | Sanders | 260/29.6 S |
|---|---|---|---|
| 3,043,790 | 7/1962 | Sanders | 260/29.7 S |
| 3,640,912 | 2/1972 | Reinhard et al. | 260/42.13 |
| 3,876,577 | 4/1975 | Hornig et al. | 260/29.7 T |
| 3,895,953 | 7/1975 | Mehta | 260/29.6 S |
| 4,014,843 | 3/1977 | Xanthopoulo | 260/29.7 T |
| 4,067,164 | 1/1978 | McMillan | 260/42.13 |
| 4,086,201 | 4/1978 | Peters et al. | 260/42.13 |

*Primary Examiner*—Ronald W. Griffin
*Attorney, Agent, or Firm*—R. B. Ingraham

[57] ABSTRACT

This invention is directed to cement additives consisting essentially of (1) a styrene-butadiene-acrylonitrile interpolymer latex, (2) a nonionic surfactant, (3) an anionic surfactant, and (4) a polyorganosiloxane foam depressant, which additives provide portland cement compositions having excellent strength properties.

12 Claims, No Drawings

STYRENE-BUTADIENE-ACRYLONITRILE INTERPOLYMER LATEX BASED CEMENT ADDITIVES

CROSS REFERENCE TO RELATED APPLICATION

This is a continuation-in-part of application Ser. No. 815,966, filed July 15, 1977 now abandoned.

BACKGROUND OF THE INVENTION

Portland cement is one of the most widely used materials in the construction industry. Although unmodified concrete and cement mortar systems (i.e., those not containing a polymer latex modifier) have adequate properties for many construction applications, there remain many areas in which such properties, particularly strength properties, are not acceptable.

Latex-modified portland cement systems have been developed that significantly change the physical properties of unmodified concrete and cement mortar. Of such latex-modified cement systems, the addition of styrene-butadiene polymer latexes to portland cement have provided compositions having improved strength, flexibility, adhesion, elongation at break, as well as smaller volume change. U.S. Pat. No. 3,043,790 (Re 28,722) and U.S. Pat. No. 3,895,953 are directed to such latex-modified portland cement systems.

The present invention is directed to a cement additive based on a styrene-butadiene-acrylonitrile interpolymer latex, a nonionic surfactant, an anionic surfactant and a polyorganosiloxane foam depressant, and to cement compositions containing the same, having significantly improved strength properties.

SUMMARY OF THE INVENTION

A cement additive consisting essentially of (1) a styrene-butadiene-acrylonitrile interpolymer latex, said interpolymer containing from 30 to about 70 parts by weight styrene, about 30 to about 50 parts by weight butadiene and about 1 to about 20 parts by weight of acrylonitrile, said latex containing up to about 60 parts by weight of interpolymer solids, and, based on 100 parts of said interpolymer solids, (2) from about 3 to about 10 parts by weight of a nonionic surfactant, (3) from about 3 to about 10 parts by weight of an anionic surfactant, and (4) from about 0.1 to about 5 parts by weight of a polyorganosiloxane foam depressant.

DESCRIPTION OF THE PREFERRED EMBODIMENTS

The term "portland cement" is used herein to include generally the kind of product obtained by heating lime-clay mixtures, or natural cement rock, to such a temperature that practically the entire product is sintered, followed to grinding. The product is often a mixture of dicalcium and tricalcium silicate with lesser amounts of aluminate. Various additives can be included in accordance with conventional portland cement manufacturing practices. It will be understood that various modifications such as the hydraulic cements of the kind commonly known as calcium-aluminate cements can be used as substantial equivalents for the purposes of this invention.

In many instances, it may be desirable to combine the cement compositions of this invention with an aggregate material. In this regard, the preferred aggregate material is sand, however, any particulate material may be used including stone, gravel, pebbles, granite, carborundum, marble chips, mica and the like.

By the term "styrene-butadiene-acrylonitrile interpolymer latex" as used herein is meant any aqueous colloidal dispersion of an interpolymer of from about 30 to about 70 parts by weight styrene, from about 30 to about 50 parts by weight butadiene and from about 1 to about 20 parts by weight of acrylonitrile. Particularly preferred interpolymers consist essentially of about 54 to 63 weight percent styrene, about 32 to 36 weight percent butadiene and about 5 to 10 weight percent of acrylonitrile. Such interpolymers can be prepared by mixing the monomeric ingredients in the proportions corresponding to the composition of the desired interpolymer, in water containing an emulsifying agent or agents, and heated with agitation in the presence of a peroxide catalyst to initiate copolymerization as known in the art.

Illustrative of nonionic surfactants are: fatty acid esters such as glycerol monostearate, diethylene glycol laurate, propylene glycol monostearate, sorbitol monolaurate and pentaerythritol monostearate; acid derivatives of ethylene oxide products such as the reaction product of six mols of ethylene oxide with one of oleic acid; condensation products of ethylene oxide with alcohols such as stearyl alcohol; and condensation products of ethylene oxide with phenols, naphthols and alkyl phenols. Preferred are the polyoxyalkylene derivatives of propylene glycol having a molecular weight of at least about 1,000 to about 15,000; and the condensation products of ethylene oxide with alkyl phenols, particularly the di-butyl-phenoxy-nonaoxyethylene-ethanols. The above monomeric surfactants are advantageously used in concentrations of from about 3 to about 10 and preferably about 5 parts by weight based on 100 parts of latex polymer solids. Utilization of concentrations less than about 3 parts by weight result in latex-modified cement compositions having inadequate adhesion to cementitious material to which they are conventionally applied, whereas utilization of such surfactants in concentrations exceeding about 10 parts by weight are unnecessary and may adversely affect the flow properties of the latex-modified cement compositions.

Particularly preferred anionic surfactants include the alkyl aryl sulfonates such as the sodium salt of dodecylated sulfonated phenyl ether, and the sulfate derivates of higher fatty alcohols, particularly sodium lauryl sulfate. Such anionic surfactants are utilized in amounts of from about 3 to about 10 parts by weight, based on 100 parts of latex interpolymer solids, and preferably about 5 parts per 100 parts of latex interpolymer solids.

Illustrative of the polyorganosiloxanes are the condensation products resulting from polymerization of organo silane diols, as represented by the formula

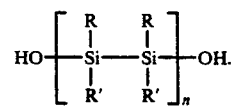

where R and R', in the above formula, represent organic radicals such as alkyl, aryl, aralkyl and alkaryl or heterocyclic groups, and n is one or more. Also useful are polymerization products of organo silane diols, in the presence of an organo silane monol, and condensation products obtained from mixtures of orgnao silane triols, diols and monols.

Preferably the organo substituent of the siloxanes is lower alkyl (i.e., methyl, ehtyl, propyl), cyclohexyl or phenyl. Most preferably it is methyl, and accordingly, the preferred polyorganosiloxanes are those which are condensation products of methyl silicols, and most preferably condensation products of dimethyl silane diol.

Polyorganosiloxanes are commercially available in several forms which are designated in the trade as "silicone fluids", "silicone emulsions" and "silicone compounds", the latter being siloxanes modified by the addition of a small percentage of finely divided silica or other inert divided solid. Any of these forms can be used in the practice of this invention.

Cement mixes are made according to the present invention by simply adding the cement additive prescribed herein to the cement with mixing and such added water as is necessary to obtain a cement mix of desired flow and working consistency. If the cement additive of the invention and portland cement are to be employed in the manufacture of mortar or concrete by admixture with a mineral aggregate, such as sand or a mixture of sand with gravel, crushed stone or equivalent coarse aggregate, the cement will ordinarily constitute, in accordance with conventional practices, more than about 10 percent by weight of the mineral aggregate and usually from about 15 to 35 percent of the weight of the mineral aggregate.

The concentration of the styrene-butadiene-acrylonitrile interpolymer solids in the cement composition necessary for the obtainment of optimum strength properties range from about 5 to about 25 parts by weight of interpolymer solids per 100 parts of cement. In this regard, concentrations less than about 5 percent, based on the weight of cement used, do not provide adequate mechanical properties such as flexibility, abrasion resistance and adherence. Further, total latex solids concentrations in excess of about 25 percent based on the weight of cement may significantly reduce the mechanical properties of the composition.

The following examples, wherein all parts and percentages are by weight, serve to illustrate the concepts of the present invention.

EXAMPLE 1

Part A—Preparation of Cement Additives

To a reaction vessel was added 1500 gms. of deionized water and 55.5 gms. of the trisodium salt of N-hydroxy-ethylethylenediaminetriacetic acid (as a 0.5 percent aqueous solution). The mixture was then adjusted to a pH of about 3.5 by the addition of acetic acid. The reactor was then purged with nitrogen and heated to a temperature of about 90° C. Thereafter, a monomer stream composed of 1399 gms. of styrene (about 63 wt. %), 711 gms. of butadiene (about 32 wt. %) and 111 gms. of acrylonitrile (about 5 wt. %) was added to the reactor over a 5-hour period along with a separate aqueous stream composed of 3.7 gms. of Formopon and 2.1 gms. of t-butylhydroperoxide in 138 gms. of deionized water. This aqueous stream was added to the reactor over a 6-hour period. The reactor was then held at a temperature of 90° C. over a period of about 1 to 2 hours and steam stripped to remove residual monomer. Thereafter, the following materials were post-added to the latex.

| Material | Amt. (pts./100 pts. of latex polymer solids) |
|---|---|
| Anionic surfactant - sodium lauryl sulfate | 5 |
| Nonionic surfactant (di-t-butyl-phenoxynona-oxyethylene-ethanol) | 5 |
| Polyorganosiloxane Foam Depressant (condensation product of dimethyl silane diol) | 0.4 |

The resulting cement additive contained about 48 percent polymer solids, said solids having a particle size between about 1500–1800 Å.

Part B—Evaluation of Cement Additive in Cement

Cement mortar was prepared for strength testing by mixing the following ingredients in a Hobart mixer.

| | |
|---|---|
| Standard Ottawa Crystal Silica Sand | 1950 g |
| Peerless Brand Portland Cement | 650 g |
| Cement Additive Solids | 975 g |
| H$_2$O | 228 g |

The mortar was molded into 2 in. cubes and tensile briquettes with a 1 in. square cross section in accordance with ASTM methods. The specimens were wet-cured for 24 hours, and cured in air at 75° F. and 50 percent R. H. for an additional 27 days. Half the specimens were tested for compressive and tensile strength. The other half was immersed in water for 7 additional days and then tested wet. The data were compared to a mortar prepared as described herein but utilizing a copolymer of 68 parts by weight styrene and 32 parts by weight of butadiene. The following Table I sets forth the cement additive compositions and cement strength properties.

TABLE I

| | Cement Additive | |
|---|---|---|
| Compressive Strength, psi | For Comparison (1) | The Invention (2) |
| (ASTM C-109) | | |
| (A) 14 days air dried | 6,691 | 7,230 |
| (B) 14 days air dried + 14 days immersion in H$_2$O | 5,496 | 5,720 |
| Tensile Strength, psi | | |
| (ASTM C-109–14 days air dried + 14 days immersed in H$_2$O) | 572 | 610 |
| Vicat (mm) | | |
| (ASTM C-42) | 41 | 39 |
| Sand to Cement ratio | 3/1 | 3/1 |
| Cement additive solids/cement ratio | 0.15/1 | 0.15/1 |
| Water/cement ratio | 0.375/1 | 0.350/1 |

(1) Based on a copolymer of 68 parts by weight styrene and 32 parts by weight butadiene.
(2) Based on an interpolymer of 63 parts by weight styrene, 32 parts by weight butadiene and 5 parts by weight acrylonitrile.

EXAMPLE 2

A second series of modified cement mortar compositions was prepared as described in Example 1. The following Table II sets forth the cement additive compositions and the cement strength properties.

TABLE II

|  | Cement Additive | |
|---|---|---|
|  | For Comparison (1) | The Invention (2) |
| Tensile Strength, psi | | |
| (ASTM C-109-14 days air dried) | 797 | 912 |
| Flexural Strength, psi | | |
| (ASTM C-256-52) | 1745 | 2130 |
| Shear Bond Strength, psi | | |
| 14 days air cure + 7 days H$_2$O immersion | 135 | 238 |
| Sand/cement ratio | 3/1 | 3/1 |
| Cement additive solids/Cement ratio | 0.20/1 | 0.20/1 |
| Water/Cement ratio | 0.34/1 | 0.27/1 |

(1) Based on a copolymer of 67 parts by weight styrene and 33 parts by weight butadiene.
(2) Based on an interpolymer of 54 parts by weight styrene, 36 parts by weight butadiene and 10 parts by weight acrylonitrile.

EXAMPLE 3

A third series of modified cement mortar compositions was prepared as described in Example 1. The following Table III sets forth the cement additive compositions and the cement strength properties.

TABLE III

|  | Cement Additive | |
|---|---|---|
|  | For Comparison (1) | The Invention (2) |
| Compressive Strength, psi | | |
| (ASTM C-109) | | |
| (A) 14 days air dried | 4646 | 5704 |
| (B) 14 days air dried + 14 days immersion in gasoline | 1647 | 3667 |
| Shear Bond Strength, psi | | |
| (A) 14 days air cure | 380 | 453 |
| (B) 14 days air cure + 7 days H$_2$O immersion | 218 | 491 |
| % Weight Loss on Gasoline immersion | 11.3 | 0.8 |
| Sand/Cement ratio | 3/1 | 3/1 |
| Cement Additive Solids/Cement ratio | 0.20/1 | 0.20/1 |
| Water/Cement ratio | 0.350/1 | 0.354/1 |

(1) Based on a copolymer of 67 parts by weight styrene and 33 parts by weight butadiene.
(2) Based on an interpolymer of 54 parts by weight styrene, 36 parts by weight butadiene and 10 parts by weight acrylonitrile.

The above comparative data illustrate the significant improvement in strength properties, as well as enhanced resistance to weight loss on immersion to gasoline, obtained using the concrete modifiers as prescribed by the present invention.

While it is generally convenient to prepare the cement additive by precombining the styrene-butadiene-acrylonitrile interpolymer latex, nonionic surfactant, anionic surfactant and polyorganosiloxane antifoamer in the manner as specifically set forth herein, and then introducing the resulting mixture into the cement, cement-sand, or cement-sand-coarse aggregate mixture, it will be understood that it is not necessary that all the various components of the additive be so premixed. For example, substantially equivalent cement, mortar, or concrete mixes are obtained by separate addition of the requisite quantities of the interpolymer latex (containing sufficient anionic surfactant to avoid coagulation thereof), the remainder of the anionic surfactant and/or the nonionic polyorganosiloxane foam depressant.

What is claimed is:

1. A cement additive consisting of (1) an interpolymer latex, said interpolymer consisting of from about 30 to about 70 parts by weight styrene, from about 30 to about 50 parts by weight butadiene and from 1 to about 20 parts by weight acrylonitrile, said latex containing up to about 60 parts by weight of interpolymer solids, and, based on 100 parts by weight of said interpolymer solids, (2) from about 3 to about 10 parts by weight of a nonionic surfactant, (3) from about 3 to about 10 parts by weight of an anionic surfactant, and (4) from about 0.1 to about 5 parts by weight of a polyorganosiloxane foam depressant.

2. The cement additive of claim 1 wherein said nonionic surfactant is a di-butyl-phenoxynona-oxyethylene-ethanol.

3. The cement additive of claim 1 wherein said anionic surfactant is sodium lauryl sulfate.

4. The cement additive of claim 1 wherein said polyorganosiloxane foam depressant is a condensation product of dimethyl silane diol.

5. The cement additive of claim 1 wherein said interpolymer is an interpolymer of about 63 parts by weight styrene, about 32 parts by weight butadiene and about 5 parts by weight acrylonitrile.

6. The cement additive of claim 1 wherein said interpolymer is an interpolymer of about 54 parts by weight styrene, about 36 parts by weight butadiene and about 10 parts by weight acrylonitrile.

7. A Portland cement composition consisting of a mixture of Portland cement and a cement additive consisting of (1) an interpolymer latex, said interpolymer consisting of from about 30 to about 70 parts by weight styrene, from about 30 to about 50 parts by weight butadiene and from 1 to about 20 parts by weight acrylonitrile, said latex containing up to about 60 parts by weight of interpolymer solids and said interpolymer latex being present in an amount sufficient to provide from about 5 to about 25 parts by weight of interpolymer latex solids based on the weight of cement, and based on 100 parts of said interpolymer latex solids, (2) from about 3 to about 10 parts by weight of a nonionic surfactant, (3) from about 3 to about 10 parts by weight of an anionic surfactant, and (4) from about 0.1 about 5 parts by weight of a polyorganosiloxane foam depressant.

8. The portland cement composition of claim 7 wherein said nonionic surfactant is a dibutyl-phenoxynonaoxyethylene-ethanol.

9. The portland cement composition of claim 7 wherein said anionic surfactant is sodium lauryl sulfate.

10. The portland cement composition of claim 7 wherein said polyorganosiloxane foam depressant is a condensation product of dimethyl silane diol.

11. The portland cement composition of claim 7 wherein said interpolymer is an interpolymer of about 63 parts by weight styrene, about 32 parts by weight butadiene and about 5 parts by weight acrylonitrile.

12. The portland cement composition of claim 7 wherein said interpolymer is an interpolymer of about 54 parts by weight styrene, about 36 parts by weight butadiene and about 10 parts by weight acrylonitrile.

* * * * *